United States Patent [19]

Barnes et al.

[11] 4,196,063
[45] Apr. 1, 1980

[54] ELECTRODEPOSITION OF BLACK CHROMIUM

[75] Inventors: Clive Barnes, West Hanney; John J. B. Ward, Wantage, both of England

[73] Assignee: International Lead Zinc Research Organization, Inc., New York, N.Y.

[21] Appl. No.: 31,748

[22] Filed: Apr. 19, 1979

[30] Foreign Application Priority Data

Jun. 2, 1978 [GB] United Kingdom ............... 26286/78

[51] Int. Cl.$^2$ ............................................... C25D 3/56
[52] U.S. Cl. ................................................. 204/43 R
[58] Field of Search ..................... 204/43 R, 51, 123

[56] References Cited

U.S. PATENT DOCUMENTS

| Re. 29,749 | 8/1978 | Gyllenspetz et al. | 204/43 R X |
| 2,990,343 | 6/1961 | Safranek | 204/43 R |
| 3,620,935 | 11/1971 | Willson | 204/51 X |
| 3,917,517 | 11/1975 | Jordan et al. | 204/43 R X |

*Primary Examiner*—G. L. Kaplan
*Attorney, Agent, or Firm*—Brumbaugh, Graves, Donohue and Raymond

[57] ABSTRACT

An electrolyte solution and the method of using same for electrodeposition of black chromium on a substrate, said solution comprising water, trivalent chromium ions, ions of a metal selected from the group consisting of iron and cobalt, a weak complexing agent for the trivalent chromium ions, and phosphate ions. The preferred complexing agents are hypophosphite or formate.

10 Claims, No Drawings

ELECTRODEPOSITION OF BLACK CHROMIUM

The present invention relates to electroplating baths for use in producing black chromium deposits or coatings and to methods of producing black chromium deposits or coatings using such baths. So-called black chromium coatings are to be distinguished over conventional chromium coatings such as are seen on conventional automobile bumpers and the like in that while not necessarily black in color, they are significantly darker than conventional chromium coatings.

Black chromium coatings have been used extensively for decorative purposes. More recently they have found an application in the production of solar collector panels as solar radiation absorbing coatings.

Conventionally, black chromium coatings are produced using hexavalent chromium electroplating baths which have been "doctored" with small amounts of organic or inorganic acids.

Coatings produced by this method have certain recognized disadvantages. One of these is that black chromium coatings produced from hexavalent chromium baths contain up to about 30% oxides of chromium. These oxide-containing coatings are poor conductors of heat and electricity. This poor thermal conductivity is particularly disadvantageous in applications, such as solar panels, which are intended primarily to absorb solar radiation for the purpose of converting it to usable forms of energy. Furthermore, these coatings have low wear-resistance and are friable.

It has now been found that the problems associated with hexavalent black chromium-containing coatings are overcome by using a trivalent chromium electroplating bath. Furthermore, the effluent disposal difficulties which arise with hexavalent chromium are reduced.

The invention accordingly provides an aqueous electroplating bath for producing black chromium deposits which bath contains
$Cr^{III}$ ions,
Cobalt or iron ions in a concentration of from 2 to 25 g/l,
a weak complexing agent for the $Cr^{III}$ ions, and phosphate ions in a concentration of from 1 to 5 g/l.

The invention also provides a method of electrodepositing black chromium-containing coatings onto a substrate which method comprises providing an anode, a cathode comprising the substrate to be coated, immersing said anode and cathode in a bath as described above and passing an electric current between the anode and the cathode.

The concentration of $Cr^{III}$ ions in the electrolyte will typically be from 0.1 to 2.0 molar, preferably from 0.35 to 1.3 molar. In practice, since chromium salts are relatively expensive, the chromium concentration will be kept as low as conveniently possible to minimize the capital cost of making up the bath and to reduce drag-out on work pieces.

The concentration of cobalt or iron ions in the electrolyte is essentially within the range of from 2 to 25 g/l, and preferably from 5 to 25 g/l.

The valency state of iron and cobalt should be preferably divalent. Trivalent iron may be added but this will be rapidly reduced by hypophosphite to produce divalent iron and the beneficial material phosphate.

Although cobalt ions and iron ions are both useful in the invention, cobalt ions are preferably employed because they give a darker color to the coatings. Cobalt-containing chromium coatings have a better corrosion resistance than iron-containing chromium coatings. Furthermore, in the event of tarnishing in air, the cobalt will produce black cobalt oxides whereas the oxides formed by iron in the coating will be light colored.

At cobalt ion concentrations of less than 2 g/l, there is no dramatic effect on the color of the chromium coating produced. However, at cobalt ion concentrations of from 5 to 25 g/l the chromium coatings produced are distinctly, and increasingly, black. At cobalt ion concentrations of greater than 25 g/l there is no further blackening produced in the electrodeposited layers. Also, such high cobalt ion concentrations cause a lowering of the corrosion resistance of the electrodeposited black chromium coatings.

The cobalt or iron is added to the trivalent chromium bath as a soluble salt. The anion of this salt is preferably chloride or sulphate anion. However, any anion that does not have a deleterious effect on the bath may be used. This, therefore, excludes anions such as nitrate because of their oxidizing ability which is undesirable in the bath of the invention.

The electroplating bath of the invention contains a weak complexing agent for $Cr^{III}$ ions. The term "weak complexing agent" refers to an agent which forms a coordination complex with trivalent chromium but which does not prevent the electrodeposition of chromium from aqueous solutions containing the complex. A list of suitable weak complexing agents is given in British Patent Specification No. 1,488,381, the disclosure of which is incorporated herein by reference.

The weak complexing agent is, preferably, present in the aqueous plating bath at a concentration of from 0.1 to 6.0 molar, and particularly from 0.25 to 6.0 molar.

Of the possible weak complexing agents that may be utilized in the present invention, hypophosphite and formate ions are preferred. When hypophosphite is used, it is used at a preferable concentration of from 0.08 to 2.0 molar and particularly from 0.2 to 2.0 molar. The use of hypophosphite in trivalent chromium baths is illustrated in British Patent Specifications Nos. 1,482,747; 1,488,381; 1,498,532 and 1,498,533.

A further essential component of the trivalent chromium bath of the invention is phosphate. The phosphate used may be any soluble inorganic orthophosphate or pyrophosphate which will hydrolyze to orthophosphate. These phosphates will dissociate in solution depending on the pH to give dihydrogenorthophosphate ions, $H_2PO_4^{3-}$, or monohydrogenorthophosphate ions $HPO_4^{2-}$. The cations of the phosphate salts will be any that do not have any deleterious effect on the bath. These cations will, apart from iron, chromium and cobalt cations, be non-codepositable. Suitable non-codepositable cations are $NH_4^+$, $Na^+$ and $Mg^{++}$.

The amount of phosphate in the bath is critical and is from 1 to 5 g/l (as phosphate). Below 1 g/l the phosphate is ineffective to increase the blackness of the deposit and above 5 g/l the phosphate will reduce the amount of chromium in the co-deposit.

As is usual in the prior art trivalent chromium baths, the electrolytic anion is preferably sulphate or halide anion. The electrolyte may further contain other additives which will improve the bath performance and the properties of the electrodeposit and the use of these bath additives is well-known. Examples of such additives will include boric acid, borates or fluoborates which increase the efficiency of deposition at high current densities. Other salts, especially fluorides and chlorides of alkali and alkaline-earth metals, such as NaF, NaCl and CaCl$_2$, and also NH$_4$Cl, may be added to improve the bath performance in respect of the plating range, current efficiency and covering power. Surfactants and levellers may also be added to the bath, if desired.

The pH of the bath liquor will preferably be within the range of from 1 to 4, however the preferred coatings which are blacker and more wear-resistant are produced from a bath having a pH within the range of from 2.0 to 2.8. Low pH's favor Cr deposition and high pH's favor Co or Fe deposition.

The temperature range over which the present invention is operable is similar to that for conventional trivalent chromium electrolytes, however it is preferred that the electroplating process is carried out at a temperature of between 25° C. and 45° C., more preferably at 25° to 40° C., and especially at 35° C. Operating temperatures of below 25° C. tend to produce deposits which are more rich in cobalt or iron than is actually desired. Above 45° C., the deposits produced by the process contain cobalt or iron in an amount which is lower than desired.

Provided that the above-defined limits are adhered to, a black electrodeposit of chromium with cobalt or iron will be obtained, which may have a metal content greater than 95% and better electrical and thermal conductivity, better wear resistance and better toughness than black deposits from hexavalent chromium baths. When a suitably flat substrate is used, a specularly reflective black electro-deposited decorative layer is obtained. The cost and the other physical properties of the deposit, e.g. corrosion resistance, are related to the cobalt or iron content of the deposit, and this is determined principally by four factors:

(a) the cobalt or iron content of the plating bath;

(b) the phosphate content of the plating bath; high phosphate contents favor deposition of cobalt or iron rather than chromium;

(c) the pH of the plating bath; high pH favors deposition of cobalt or iron rather than chromium;

(d) the plating temperature; low temperatures favor deposition of cobalt or iron rather than chromium.

By altering these parameters it is readily possible to control the cobalt or iron content of the electrodeposit. Where corrosion-resistance is important, it will generally be preferred to minimize the cobalt or iron content of the deposition.

The anode may be formed from any suitable material known not to impair the performance of the electrolyte or dissolve or disintegrate into the bath. Chromium metal, for instance, could not be used because it would lead to Cr$^{VI}$ poisoning of the electrolyte. Carbon anodes are preferred because of their high conductivity and resistance to corrosion. In the preferred bath containing cobalt ions, a balanced cobalt and carbon anode may be used. This causes the concentration of cobalt ions in solution to be maintained. When carbon and cobalt anodes are used the surface area ratio of carbon: cobalt should preferably be not less than 12:1.

The method of electrodeposition of the invention will generally be carried out using a plating current density range of 30 to 10,000 amps per square meter.

The bath is also, preferably, fitted with an agitator or stirrer to maintain constant conditions throughout the electrolyte.

Substrates that can be coated by the method may be composed of nickel, copper or zinc; copper because of its high thermal conductivity is useful for producing panels for the solar collectors. If steel is to be used, an under-coating of nickel should be applied.

The period of electrodeposition is controlled to give coatings having a thickness of from 0.005 to 12.5 μm. Below 0.005 μm the coatings are grey and above 12.5 μm they tend to be friable and are also not black. Preferably for decorative coatings, the period of electrodeposition is controlled to give a desired thickness of from 0.1 to 2.5 μm.

The bath of the invention may be used not only for rack plating but also for barrel-plating articles.

The following Examples illustrate the invention.

EXAMPLE I

An electroplating bath having the following composition was made up:

0.5 mole Cr$_2$(SO$_4$)$_3$.9H$_2$O (1.0 M Cr$^{III}$)
1.0 mole NH$_4$Cl
1.0 mole NaH$_2$PO$_2$.H$_2$O
1.0 mole B(OH)$_3$
1 g Co$^{II}$ (as Cl$^-$)

and made up to 1 liter with water.

A nickel sheet was plated in this electrolyte using a plating current density range of 75 to 6000 Am$^{-2}$. for 2 minutes at 35° C. (Hull cel voltage=18V, Hull cell current 10A).

The coating obtained on the nickel sheet after this treatment is a normal chromium coating with no strong darkened coloration.

EXAMPLE II

The procedure of Example I was repeated except that 1 g of phosphate (as NaH$_2$PO$_4$) was included in the composition before the water was added.

The coating obtained after the electrodeposition has a fairly black color.

EXAMPLE III

The procedure of Example I was repeated except that 5 g of Co$^{II}$ were used. The coating obtained was fairly black.

EXAMPLE VI

The procedure of Example III was repeated except that the composition additionally contained 1 g/l of phosphate (of NaH$_2$PO$_4$). The electrodeposition procedure gave coatings having a very good black coloration and good hardness.

EXAMPLE V

The electroplating bath having the followng composition was made up:

0.8 M Cr$^{III}$ (as chloride)
1.5 M NH$_4$Cl
0.75 M B(OH)$_3$
0.75 M NaH$_2$PO$_2$.H$_2$O
0.5 M NaF
20 g/l Co$^{II}$ (as chloride)
1 g/l phosphate (as NaH$_2$PO$_4$)
10 ppm cetyl trimethylammonium bromide The bath was used to plate a copper sheet for 2 minutes at 35° C. at a plating current density range of from 60 to 5000 Am$^{-2}$.

The copper sheet was coated with a very black chromium layer having excellent wear and corrosion resistance.

EXAMPLE VI

The procedure of Example V was repeated except that 25 g/l of $Co^{II}$ and 5 g/l of phosphate are used. The resulting deposit was black but because 50% of the deposit is Co, the deposit had relatively poor corrosion resistance.

Similar results were obtained when these Examples were repeated but using ferrous chloride instead of cobalt chloride.

We claim:

1. An electrolyte solution for electrodeposition of black chromium on a substrate, said solution comprising water, trivalent chromium ions in a concentration of from about 0.01M to about 2.0M, from about 2 to about 25 g/l of ions of a metal selected from the group consisting of iron and cobalt, phosphate ions in a concentration of from 1 to about 5 g/l, and from about 0.1M to about 6M of a weak complexing agent selected from the group consisting of hypophosphite and formate.

2. An electrolyte solution according to claim 1 wherein the weak complexing agent is hypophosphite.

3. An electrolyte solution according to claim 1 wherein the weak complexing agent is formate.

4. An electrolyte solution according to claims 2 or 3 wherein the metal is iron.

5. An electrolyte solution according to claims 2 or 3 wherein the metal is cobalt.

6. A method of electrodepositing a black chromium coating on a substrate which comprises immersing said substrate in an electrolyte solution comprising water, trivalent chromium ions in a concentration of from about 0.01M to about 2.0M, from about 2 to about 25 g/l of ions of a metal selected from the group consisting of iron and cobalt, phosphate ions in a concentration of from about 1 to about 5 g/l, and from about 0.1M to about 6M of a weak complexing agent selected from the group consisting of hypophosphite and formate and passing an electric current through said solution thereby to deposit on said substrate said trivalent chromium ions and said other co-depositable metal ions together as a black chromium coating.

7. A method according to claim 6 wherein the weak complexing agent is hypophosphite.

8. A method according to claim 6 wherein the weak complexing agent is formate.

9. A method according to claims 7 or 8 wherein the metal is iron.

10. A method according to claims 7 or 8 wherein the metal is cobalt.

* * * * *